(12) United States Patent
Tullis

(10) Patent No.: US 6,188,058 B1
(45) Date of Patent: Feb. 13, 2001

(54) SYSTEM FOR TAKING DISPLACEMENT MEASUREMENTS HAVING PHOTOSENSORS WITH IMAGED PATTERN ARRANGEMENT

(75) Inventor: Barclay J. Tullis, Palo Alto, CA (US)

(73) Assignee: Agilent Technologies Inc., Palo Alto, CA (US)

( * ) Notice: Under 35 U.S.C. 154(b), the term of this patent shall be extended for 0 days.

(21) Appl. No.: 09/154,931

(22) Filed: Sep. 17, 1998

(51) Int. Cl.[7] .................................................. H01L 27/00
(52) U.S. Cl. ................................ 250/208.1; 250/559.38
(58) Field of Search .......................... 250/559.32, 559.38, 250/231.16, 237 G, 208.1; 356/373, 375, 374

(56) References Cited

U.S. PATENT DOCUMENTS

| | | | |
|---|---|---|---|
| 4,198,758 | 4/1980 | Eineichner et al. ................... 33/127 |
| 4,274,783 | 6/1981 | Einieichner et al. ................. 414/134 |
| 5,089,712 | 2/1992 | Holland ................................ 250/557 |
| 5,124,548 | * 6/1992 | Igaki ............................... 250/231.16 |
| 5,149,980 | 9/1992 | Ertel et al. ........................... 250/561 |
| 5,214,280 | * 5/1993 | Rieder et al. .................... 250/231.16 |
| 5,291,131 | 3/1994 | Suzuki et al. ........................ 324/206 |
| 5,302,821 | * 4/1994 | Igaki et al. ...................... 250/231.16 |
| 5,567,976 | 10/1996 | Dierschke et al. .................. 257/443 |
| 5,578,813 | 11/1996 | Allen et al. ........................ 250/208.1 |
| 5,644,139 | 7/1997 | Allen et al. .......................... 250/557 |
| 5,686,720 | 11/1997 | Tullis ............................... 250/208.1 |
| 5,699,161 | 12/1997 | Woodworth .......................... 356/379 |
| 5,703,353 | 12/1997 | Blalock et al. ................. 250/214 C |
| 5,729,008 | 3/1998 | Blalock et al. ................... 250/208.1 |
| 5,753,908 | 5/1998 | Christensen .......................... 250/239 |

* cited by examiner

Primary Examiner—Que T. Le

(57) ABSTRACT

The present invention is generally directed to a system for taking displacement measurements of an object. The invention utilizes the Moiré effect to take precise displacement measurements of an object. In this regard, a visible pattern is disposed on an object, and a plurality of photosensors are uniformly spaced apart from the visible pattern. Importantly, the spacing between the photosensors is slightly different than the spacing between light and dark lines forming a projection or image of the visible pattern. This allows the invention to utilize the Moiré effect to accurately compute precise displacements or movements of the object. In this respect, electrical signal generated by the photosensor array will embody a repeating envelope pattern resulting from the difference in the pitch of the photosensors and the pitch of the projection or image of the visible pattern. This envelope has a spatial frequency that is significantly lower than the fundamental repetition frequency of either the image (or projection) of the visible pattern or the photosensor array, where these frequencies of the image or projection of the visible pattern and the photosensor array are equal to the reciprocal of the distances separating adjacent repetitions of pattern within the image of the visible pattern or the reciprocol of the pitch of adjacent photosensor elements respectively. Thus, small lateral motion of the object bearing the visible pattern, made parallel to the direction of the repetition of the repeating patterns, produces a relatively large shift in the position of the signal envelope which has a lower spatial frequency.

14 Claims, 9 Drawing Sheets

SYSTEM FOR TAKING DISPLACEMENT MEASUREMENTS HAVING PHOTOSENSORS WITH IMAGED PATTERN ARRANGEMENT

BACKGROUND OF THE INVENTION

1. Field of the Invention

The present invention generally relates to measurement systems, and more particularly to a system for taking displacement measurements of an object having a regular pattern preprinted thereon.

2. Discussion of the Related Art

There are a wide variety of known systems in which detecting and/or measuring the position or displacement of an object is important. For example, the system disclosed in U.S. Pat. No. 5,578,813, assigned to the assignee of the present invention and also co-invented by the inventor of the present invention, is a system and method for determining relative movement between a hand-held scanner and a web of material (i.e., piece of paper). Specifically, that system utilized an illumination/imaging sensor to detect relative movement between the scanner and the web of material by identifying structure-related properties of the web of material. The inherent structure-related properties of the web (such as paper fibers, or other constituents) were used for navigational purposes, namely to identify the navigational path of the scanner, so that the image scanned could be reconstructed electronically.

Another system is disclosed in U.S. Pat. No. 5,291,131, which discloses an apparatus for measuring the elongation of a circulating chain (elongation resulting from component wear, stretching, or otherwise). The system disclosed therein uses two sensors (e.g., magnetic or optical) disposed a predetermined distance apart along the path of the circulating chain. The distance between the two indices is calculated on the basis of the calculated speed of the moving body and the time which elapses from when a first index passed a first sensor until a second index passed a second sensor. By continuing this observation over time, and comparing the calculated distances, chain elongation can be measured. Further, similar systems predating the '131 patent include those disclosed in U.S. Pat. Nos. 4,198,758 and 4,274,783, both entitled "Chain Measuring and Conveyor Control System", co-invented by the inventor of the present invention.

As is also known in the prior art, the print head of some ink jet printers is configured to move across the print width of a sheet of paper. The deposition of ink from the print head to the sheet of paper is closely controlled based in part on positional information of the print head. In some such printers, this positional information is obtained by stretching a transparent sheet of material across the span covered by the width of the sheet of paper. This sheet of material is passed through a slot in the print head, and contains periodically-spaced demarcation lines. An optical emitter/detector pair is disposed across the slot, and is configured to count the demarcation lines. By maintaining an accurate count of the demarcation lines, the system can maintain information related to the position of the print head along the sheet of paper. In such a system, the sheet of material is held stationary, while the emitter/detector pair (which is fixed to the print head) moves in relation to the sheet of material.

In systems like those mentioned above, as well as many other systems, there is a desire to obtain accurate and precise displacement measurements of an object. Accordingly, it is desired to provide an apparatus and method that effectively measures object displacements.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the devices and combinations particularly pointed out in the appended claims.

To achieve the advantages and novel features, the present invention is generally directed to a system for taking displacement measurements of an object. In accordance with one aspect of the invention, the system includes an object having a visible pattern disposed thereon (the term "visible pattern" will be used throughout to represent any pattern sensed with a photosensor array, whether or not the illumination involved is in the visible spectrum or not). In this regard, the pattern is defined by areas of systematically alternating contrast (e.g. black and white or other colors). A plurality of photosensors are uniformly spaced apart from the visible pattern, and are further disposed in a configuration similar to the visible pattern. In this regard, if the visible pattern is a repeating circular pattern, then the photosensors are disposed in a repeating circular pattern. If the visible pattern is a plurality of parallel, linear demarcations, then the plurality of photosensors may be disposed in a linear array. A lens is disposed to image the visible pattern onto the plurality of photosensors. Preferably, the pitch, or spacing between adjacent photosensor elements, is slightly different from the spacing in the image of the contrasting areas defining the visible pattern. As will be discussed in further detail below, this allows the invention to utilize the Moiré effect to take precise displacement measurements of the object.

In accordance with this aspect of the invention, a circuit is electrically connected to the plurality of photosensors, wherein the circuit is configured to evaluate an electrical signal generated by the plurality of photosensors to determine the displacement of the object. In this regard, the electrical signal will embody a repeating envelope pattern resulting from the difference in the pitch of the photosensors and the pitch of the image of the visible pattern. This envelope has a spatial frequency that is significantly lower than the frequency of either the visible pattern in the image or the photosensor array, where the frequencies of the visible pattern in the image and the photosensor array are equal to the reciprocals of the distances separating adjacent pattern demarcations in the image or adjacent photosensor elements respectively. In this regard, lateral motions of the object bearing the visible pattern, made parallel to the direction of the repetition of the repeating patterns, produces a shift in the position of the lower spatial frequency signal envelope. Even slight displacements of the object bearing the visible pattern can be readily detected since they cause relatively large displacements of the envelope pattern which itself has a lower spatial frequency. Object motions that include rotation within the object plane of the imaging optics produce more complicated motions of the envelope signal but also allow increased precision in detection of these generalized motions.

In accordance with this preferred embodiment, the lens is a telecentric lens. A telecentric lens may include an aperture at a focal distance behind a first lens or lens group to prevent changes in an object's field position from causing magnification changes. A second lens may be placed behind the aperture at a distance equal to its focal length, for the purpose of similarly preventing changes in the focal position of a detector from also causing magnification changes. The individual lenses of the telecentric lens are aligned along a central axis.

Depending upon system application needs, another but alternative implementation doesn't require an imaging lens. In this form of implementation, an object surface may be placed in close proximity to the photosensor array with illumination provided through the object or from light sources interstitial to the array.

In accordance with another aspect of the invention, a system is provided for measuring the tilt of an object and doesn't require use of patterns that are necessarily systematic. In this aspect, a first photosensor array is disposed alongside a central axis and angled with respect to the central axis. Similarly, a second photosensor array is disposed alongside the central axis and, like the first photosensor array, is angled with respect to the central axis. Indeed, the second photosensor array is angled at an angle substantially opposite the angle of the first photosensor array. Further, the first and second photosensor arrays are disposed on a side of the telecentric lens opposite the object. Finally, a circuit is provided in electrical communication with the first and second photosensor arrays. The circuit is configured to evaluate electrical signals output from the first and second photosensor arrays to determine the tilt of the object.

In one embodiment, the photosensor arrays may be one dimensional arrays (e.g., either a column or a row of photosensor elements). In such an embodiment, the system will detect tilt in one dimension of the object (e.g., left-right tilt). In an alternative embodiment, the photosensor arrays may be two dimensional arrays. In such an embodiment, the system will detect tilt in either (or both) of two dimensions. Alternatively, a beam splitter may be used to allow the pair of tilted arrays to be optically centered on a central axis without physical interference.

In accordance with yet another embodiment of the invention, another system is provided for tracking the movement of a target object in three-dimensional space. In accordance with this aspect of the invention, the system includes two different lenses oriented in a similar, but slightly different direction. More particularly, a first lens having a relatively deep depth of field is disposed along a first optical axis. Similarly, a second lens also having a relatively deep depth of field is disposed along a second optical axis. The second optical axis is slightly angled with respect to the first optical axis so that they are not parallel, but in such a way that the first and second lenses have a shared field of view in which a target object, for tracking, may be located. In this regard, a first photosensor array is disposed substantially orthogonal to the first optical axis and opposite the shared field of view. Likewise, a second photosensor array is disposed substantially orthogonal to the second optical axis and opposite the shared field of view. Finally, a circuit is disposed in electrical communication with the first and second photosensor arrays, wherein the circuit is configured to evaluate electrical signals output from the first and second photosensor arrays to track the movement of an object within the shared field of view. The evaluation of the outputs from the photosensor arrays may involve correlation between the two images or may use more heuristic algorithms. As discussed above, contrast patterns may furthermore be manifested on the object to enable Moire amplification of lateral displacements to achieve higher precision if telecentric lenses are used or if object displacement components parallel to the optical axis are small and magnification changes are tracked.

As is known by persons in the art, a variety of systems use correlation techniques of various types to measure image displacements between sequential images of a moving object. For example, U.S. Pat. No. 5,729,008 entitled "Method and Device for Tracking Relative Movement by Correlating Signals from an Array of Photoelements," U.S. Pat. No. 5,703,353 entitled "Offset Removal and Spatial Frequency Band Filtering Circuitry for Photoreceiver Signals," U.S. Pat. No. 5,686,720 entitled "Method and Device for Achieving High Contrast Surface Illumination", U.S. Pat. No. 5,644,139 entitled "Navigation Technique for Detecting Movement of Navigation Sensors Relative to an Object", all assigned to the assignee of the present invention, and U.S. Pat. No. 5,578,813 referenced above all discuss various correlation techniques, and are each incorporated herein by reference. Such techniques may be employed by the novel structures of the present invention, and need not be described herein.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1A:
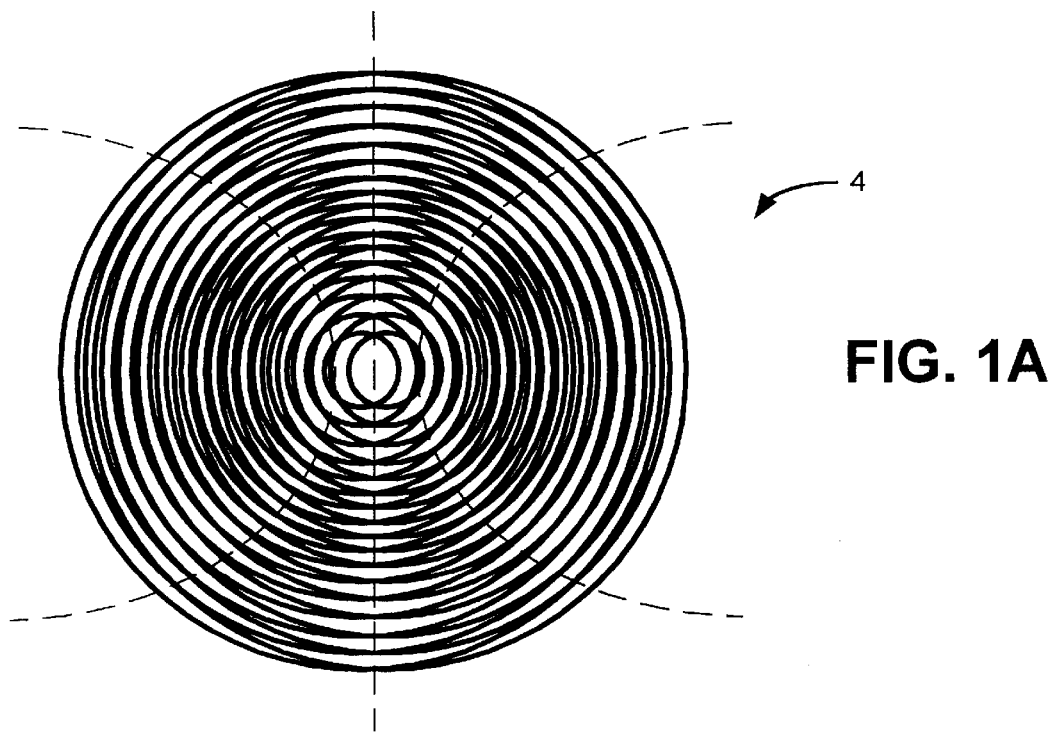
FIGS. 1A–1C are drawings that illustrate the Moiré effect as two sets of identically-sized concentric circles are moved laterally with respect to each other.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Reference is now made to FIGS. 1 through 3, which illustrate a few very simple Moiré patterns, or patterns illustrating the Moiré effect. Broadly stated, the Moiré effect is an optical phenomenon resulting from the superposition of two (or more) similar periodic or quasi-periodic structures. For example, when two line/space grids—such a grid being considered as any one or two dimensional pattern of alternating dark and light (or color varied) bands (herein loosely called lines) of a regularly repetitive nature—are superimposed, the intersections of the lines (or spaces) of the two grids determine another repetitive pattern called a Moiré pattern. Although Moiré patterns and the Moiré effect have been well documented and are understood by persons skilled in the art, a few simple patterns have been depicted herein for completeness and illustration.

Figure 1B:
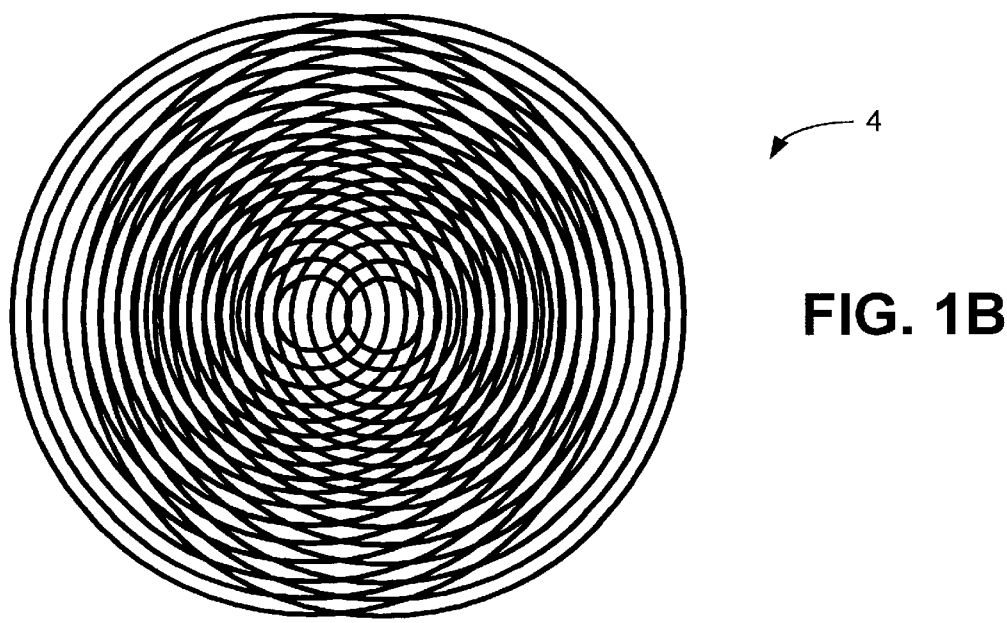
Figure 1C:
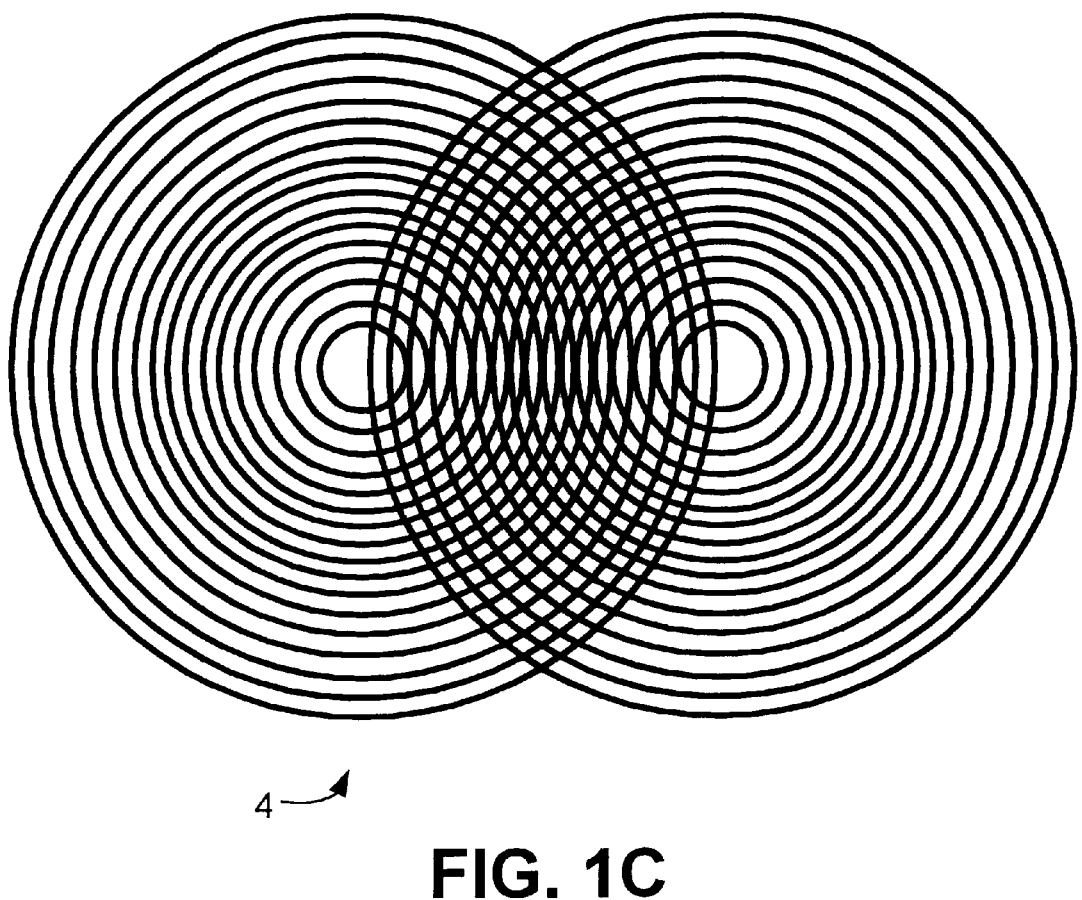

In this regard, FIGS. 1A through 1C illustrate the Moire effect using a simple pattern of bands in concentric circles. Specifically, the drawings illustrate a pattern of duplicate concentric circles disposed to overlap in varying degree. FIG. 1A depicts that concentric circles substantially overlapping, while FIG. 1B illustrates a greater separation of the centers of the patterns, and FIG. 1C illustrates an even further separation of the two patterns. As shown, each of the drawings is characterized by a unique overlap between the two patterns, which provides different visual effects. It can be noted in these cases that the patterns which develop are curved lines that are hyperbolic in shape. For example, dashed lines are provided in FIG. 1A to illustrate the pattern. There is illustrated a central, substantially vertical, dashed line and two horizontally offset curved (hyperbolic) dashed lines that follow a pattern formed by the overlapping bands. Although not illustrated with further dashed lines, it can be observed that as the concentric patterns move further apart (FIG. 1B) more patterns result, and the curves increase in radius.

Figure 2A:
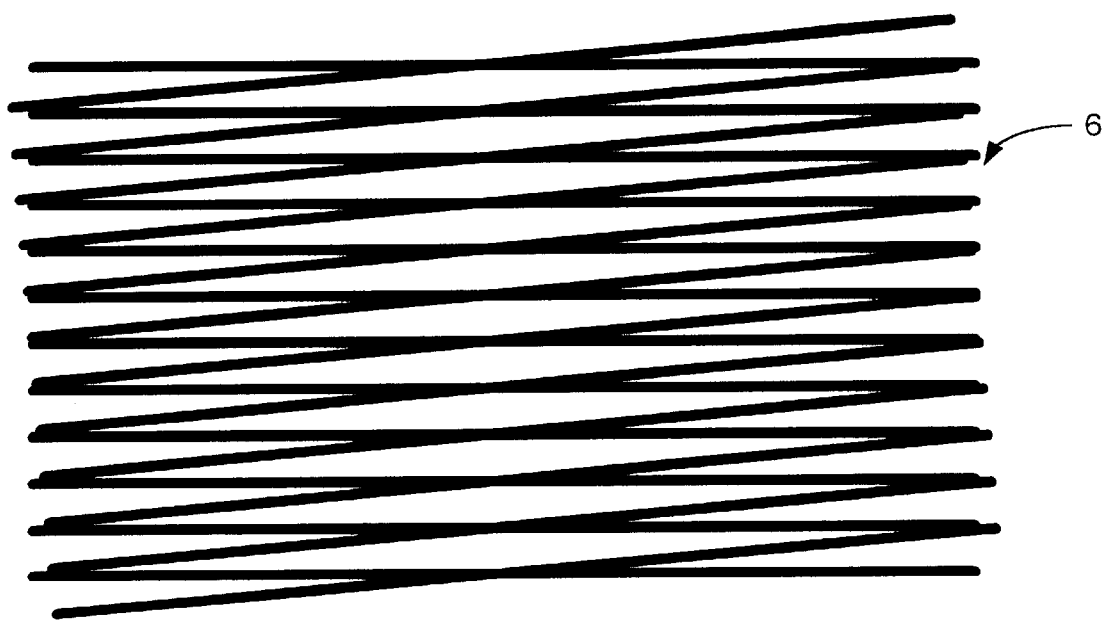
FIGS. 2A–2B are drawings that illustrate the Moiré effect as two sets of parallel lines are rotated with respect to each other.
Figure 2B:
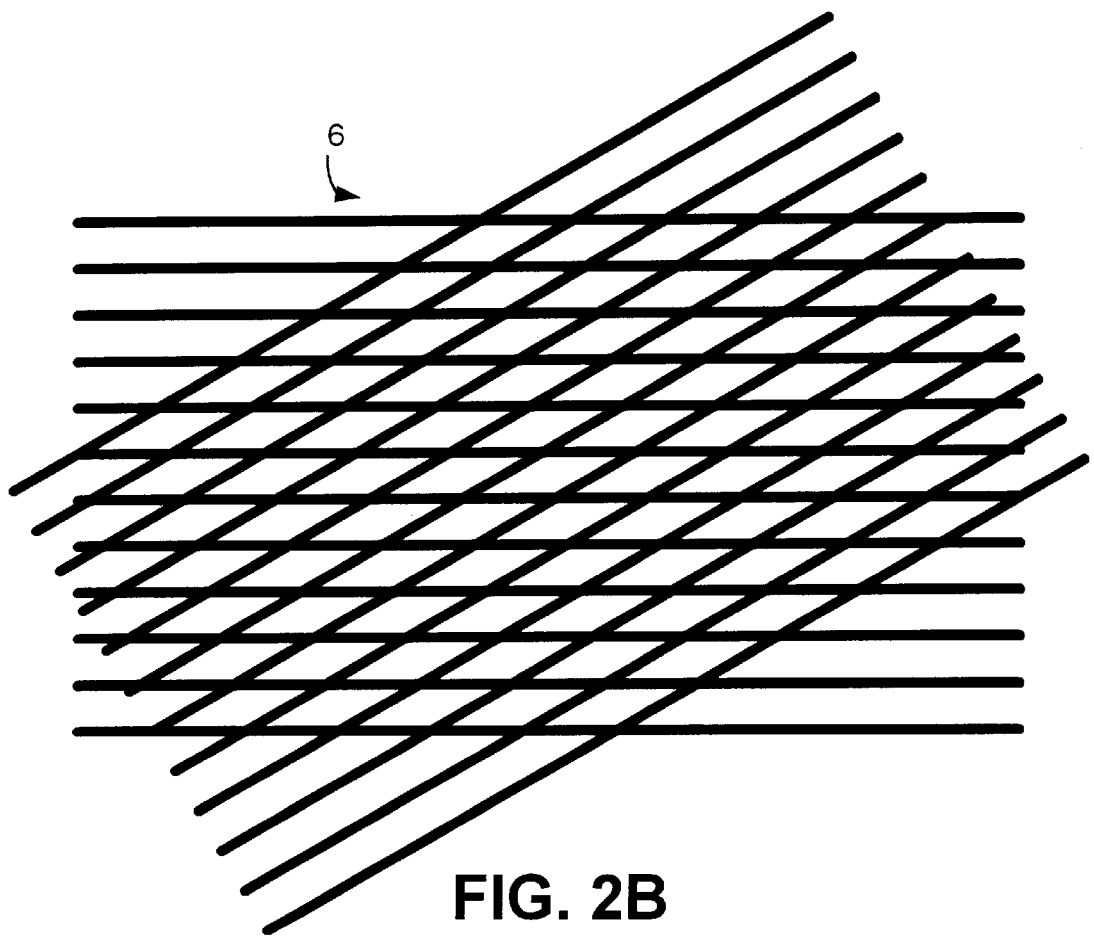

FIGS. 2A and 2B illustrate a Moiré effect that results when two sets of equally-spaced parallel lines or bands are rotated with respect to one another. As illustrated in these drawings, when oriented at acute angles to one another, the lines form gratings (parallelograms), wherein the length of the parallelograms increases as the two patterns of lines are rotated into closer alignment. Note how visually tracing lines vertically through these intersections in FIG. 2A produce a pattern of vertical lines spaced apart horizontally by a relatively large distance. Wherein similar lines traced (mentally) in FIG. 2B become tilted from vertical and more closely spaced apart.

Figure 3A:
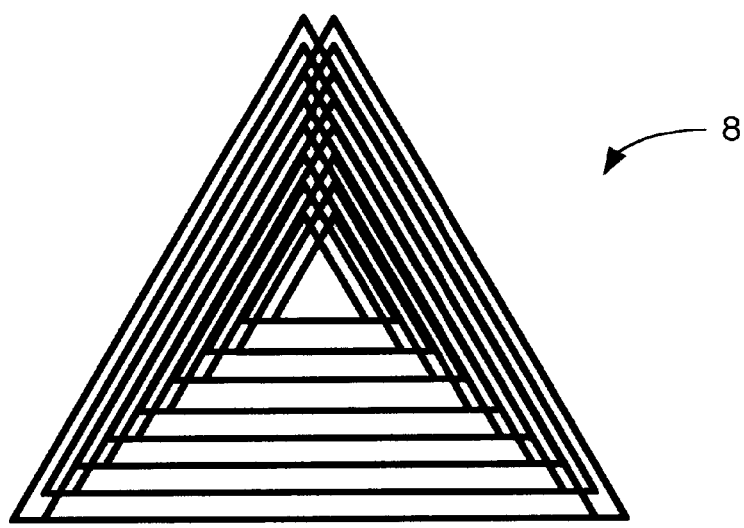
FIGS. 3A–3B are drawings that illustrate the Moiré effect as two sets of identically-sized concentric triangles are moved laterally with respect to each other.
Figure 3B:
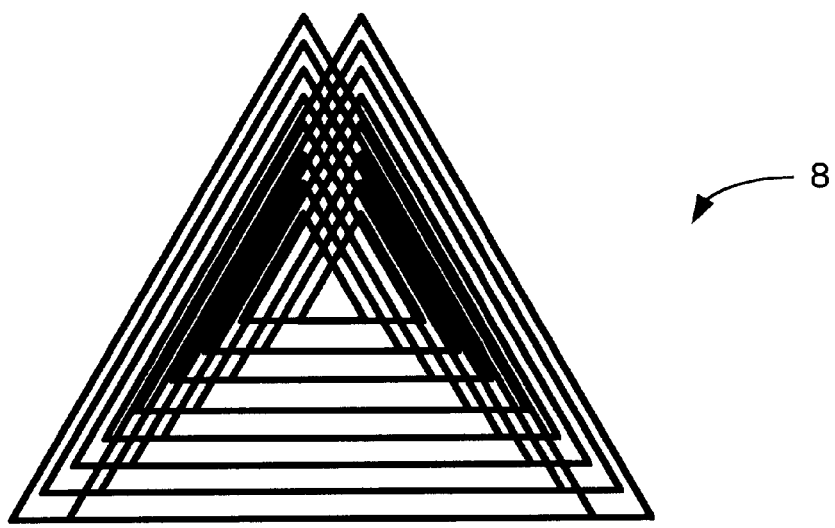

FIGS. 3A and 3B illustrate yet another pattern of lines. In this figures, an identical set of concentric triangles are shown. In FIG. 3A the two sets of triangles are lightly offset (horizontally), while in FIG. 3B is offset is larger. Again, the movement of one set of the lines with respect to the other set creates a certain visual effect within regions where lines from the two patterns overlap (only partially detectable from the two figures). Numerous publications related to Moiré patterns have presented mathematical explanations for the patterns. However, as will be appreciated from the discussion herein, the present invention is not limited to any given set of Moiré patterns, and therefore it is unnecessary to present an extensive mathematical discussion herein. Suffice it to say, that one of ordinary skill in the art will have a sufficient understanding of the relevant mathematics to implement the concepts and teachings of the present invention.

In addition to those described above, other types of Moiré patterns and Moiré effects are known. For example, a different Moiré effect occurs when two set of equally-spaced parallel lines are overlayed. Specifically, when the spacing separating the lines of the first set is slightly different from the spacing separating the lines of the second set, a different effect is noted when the lines are moved laterally with respect to one another—i.e., in a direction orthogonal to these lines. The visual effect resulting from this movement will be different from the visual pattern that would result if both set of lines had the same spacing. In fact, small differences in pitch effect an interaction pattern of lower spatial frequency than the individual pattern-pitch frequencies, but more importantly, these interaction patterns move more than the displacement of the two separate patterns.

Figure 4A:
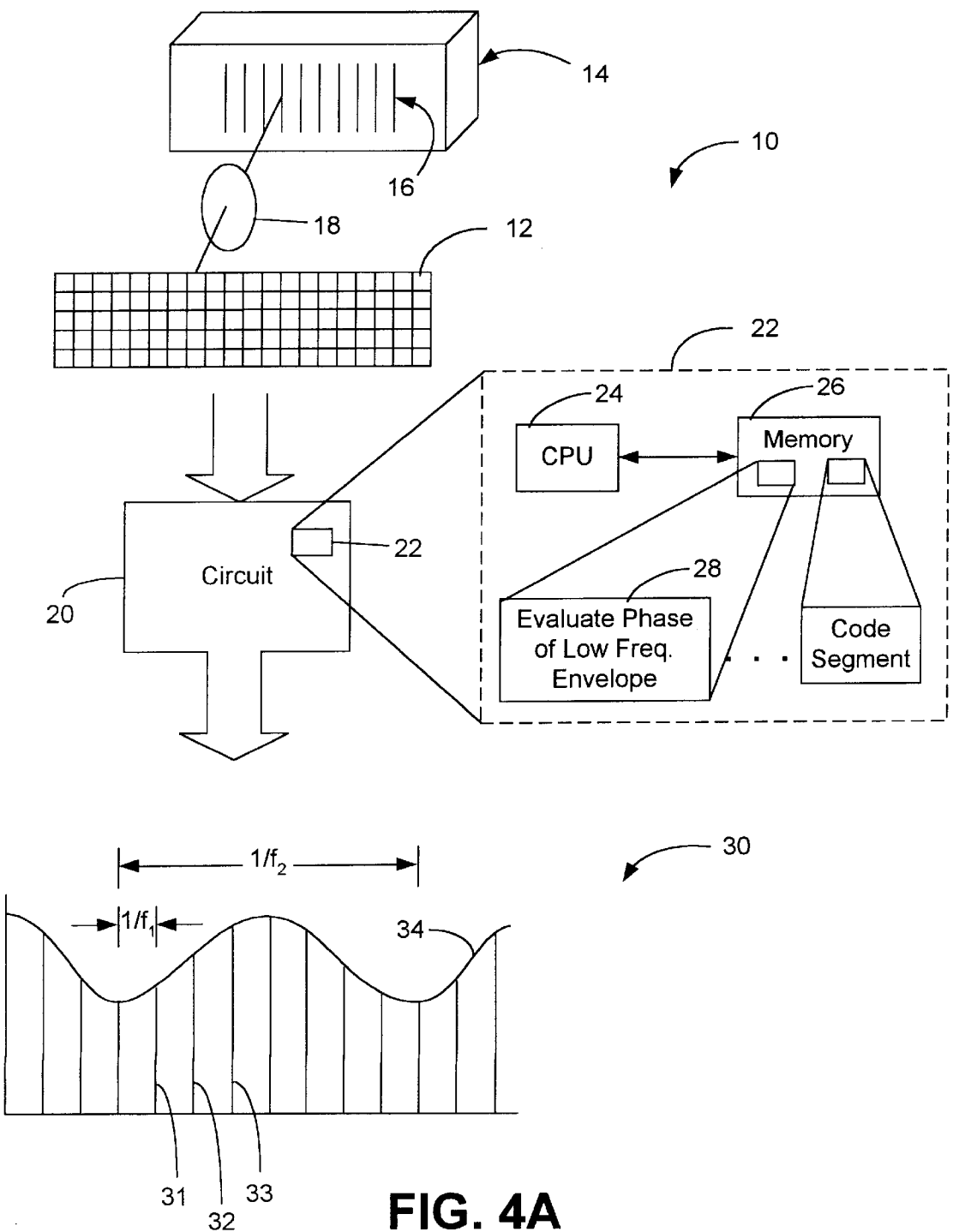
FIG. 4A is a block diagram illustrating one embodiment of the present invention that utilizes the Moiré effect of a relatively simple pattern of horizontal lines to measure the displacement of an object bearing the preprinted pattern.

In this regard, reference is now made to FIG. 4A, which illustrates a first embodiment of a system 10 for taking displacement measurements, constructed in accordance with the present invention. This system 10 utilizes the Moiré effect in a unique way, in order to carry-out detailed measurement calculations. Central to the invention is a photosensor array 12, which contains a plurality of photosensor elements. The photosensor elements are spaced apart by a regular and uniform distance, creating a natural pitch for a pattern of photosensor elements.

An object 14, includes a preprinted visible pattern 16. The pattern is a systematic, regular pattern which, for example, may be printed on the surface of the object. For purposes of the invention, it does not matter whether the object is a substantially two dimensional object, such as a piece of paper, or whether it is a three dimensional object, having the pattern 16 printed on one side thereof. Indeed, the broad concepts and teachings of the present invention are applicable to various fields and environments. What is significant for purposes of the present invention is that the systematic pattern of the pre-printed pattern, as imaged or otherwise projected onto the photosensor array, bear a close relation to the spacing of the photosensor elements comprising that array. In this regard, the pattern of FIG. 4A, as imaged or otherwise projected onto the photosensor array, is a series of equi-distant parallel thick lines that are spaced apart by a distance that is slightly different from the spacing between every other of the individual columns (or rows) of the photosensor elements of the photosensor array.

A lens 18 is disposed between the photosensor array 12 and the object 14, to project the preprinted pattern 16 onto the photosensor array. Note that the layout geometry of the elements comprising the photosensor array is what forms a second pattern which, along with the projected image of the preprinted pattern on the object, creates a Moiré effect within the outputs of the photosensor array. The photosensor elements can be made of CCDs, CMOS devices or amorphous silicon devices. The photosensor array 12, in turn, is electrically connected to a circuit 20, which is configured to evaluate the outputs of the plurality of photosensor elements. Although the system 10 need not graph the electrical signals received from the photosensor array 12, a graph 30 is provided in FIG. 4A to depict the signal values received by the circuit 20 from the photosensor array 12. In this regard, a plurality of discrete signal lines 31, 32, 33 are shown, each being defined by an amplitude. The individual signal amplitudes correspond to the amplitudes of the electrical signals output from the photosensor elements. In this regard, the photosensor elements output an electric signal that corresponds to light originating from, transmitted through, reflected from, refracted by, or diffracted by the surface containing the pattern. The graph 30 is illustrative of the signal values of one row of the photosensor array 12.

The pattern 16 illustrated in FIG. 4A consists of a series of equally-spaced parallel and thick lines, preferably with equal mark and space distances. As the image or projection of one of these lines aligns with a photosensor element, the magnitude of the electrical signal output from that photosensor element is relatively low. As the object 14 begins to move and the image or projection of the line begins to shift from its alignment with the photosensor element, then the magnitude of the electrical signal from the photosensor element begins to increase. The magnitude of the electrical signal reaches a maximum when the pattern line is completely out of phase with the photosensor element. Thus, when the image or projection of the patterned lines are spaced apart by a slightly different spacing from that which separates the photosensor elements, the signal magnitudes output from one row of photosensor elements may be as illustrated in the graph 30. Specifically, although the photosensor elements and the image or projection of the patterned lines may be spaced relatively closely together, the graph defines a signal envelope having a much lower spatial frequency.

The circuit denoted by reference numeral 20 includes, at least in part, a processing circuit 22 that is configured to evaluate the signals output from the photosensor array 12. In this regard, the circuit of the preferred embodiment of the invention may include a central processing unit (CPU) 24, a memory 26, and some program code for executing on the CPU 24. In this regard, the program code is stored within the memory 26, and it embodies software that is configured to control the operation of the CPU 24 to perform the calculations involved in the evaluation performed by the system 10. Although the software may be embodied in different forms, its will preferably include a segment 28 that evaluates the phase of the envelope 34 of the signals generated from photosensor array 12.

Thus, from the system described above, a very slight movement of the object 14 effects the phase of the lower spatial frequency or envelope 34 is a readily quantifiable way. That is, a very slight movement of the object 14 carrying the preprinted pattern 16, results in a much larger change in the envelope 34 of the signal 30.

The Moire patterns that can result from rotational misalignment between the pattern 16 and the photosensor array 12 can be detected and accommodated algorithmically to produce correct measurements of both displacement and rotation. Preferably, the lens (i.e., . . . ) 18 will be one or two lens groups and an optical stop, forming a telecentric lens. As will be appreciated, the use of a telecentric lens 18 allows the pattern surface to deviate from the focal plane of the lens, without significantly affecting the pitch of the image pattern at the array, by an otherwise change in effective magnification.

Although illustrated as a two dimensional array of photosensor elements, it will be appreciated that the photosensor array 12 may be implemented as a one-dimensional array of photosensor elements. If the only measurement of interest is a one-dimensional movement (e.g., left/right movement) of the object 14 and rotational alignment is not an issue, then a one dimensional array or photosensor elements is all that is required. However, a two-dimensional photosensor array 12 (as illustrated) is desired, as it is capable of measuring both left/right movement of the object, both up/down movement, and rotational movement of the object.

Figure 4B:
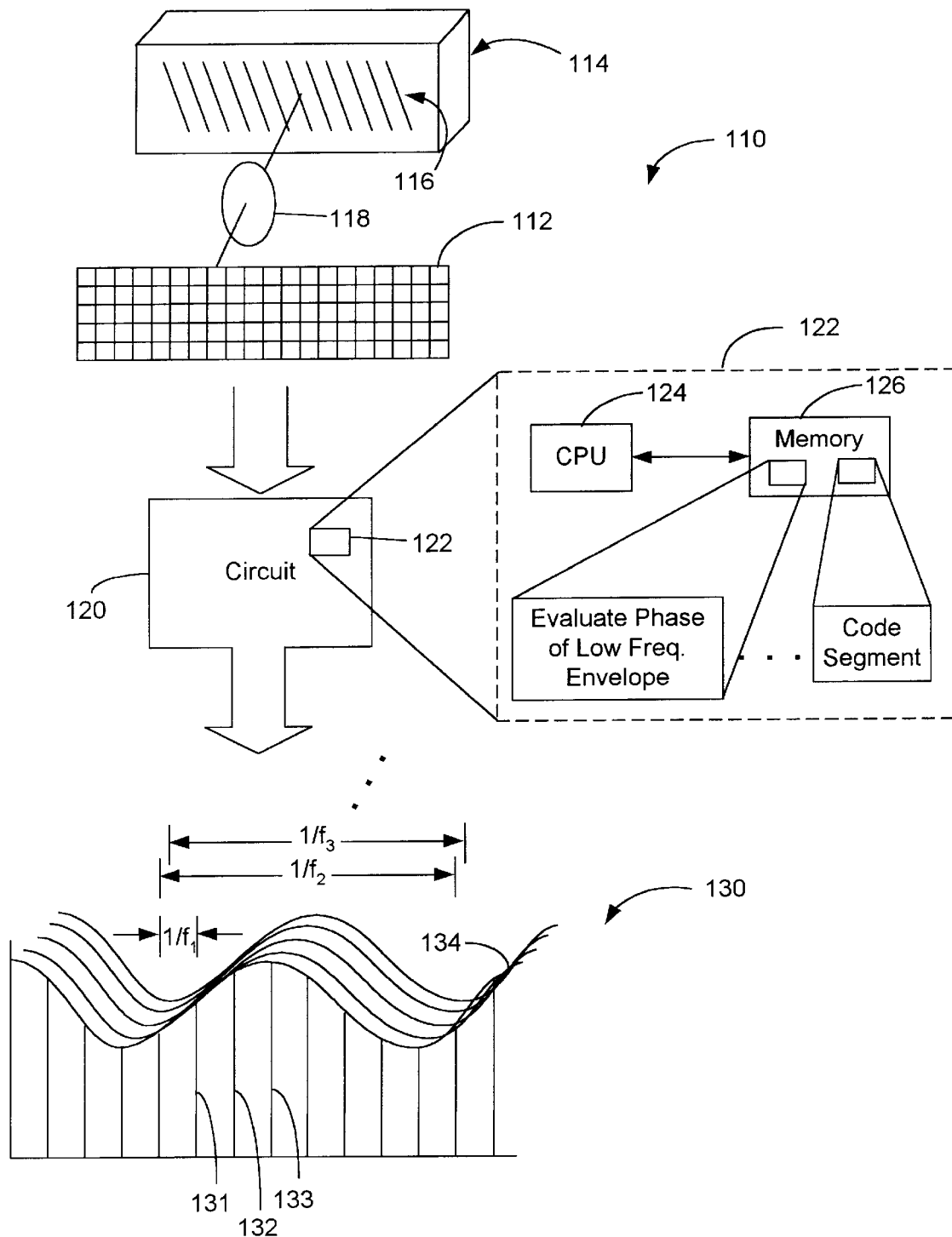
FIG. 4B is a block diagram similar to that illustrated in FIG. 4A, but illustrating a pattern of skewed lines.

As is illustrated by the waveforms 30 and 130 in FIGS. 4A and 4B, repeating envelope patterns 34 and 134 result from the difference in the pitch of the visible pattern, as imaged or projected onto the photosensor array, and the pitch of the photosensors. These envelopes 34, 134 are reflected in the waveforms 30, 130. As is illustrated, the envelope has a spatial frequency that is significantly lower than the frequency of either the imaged (or projected) visible pattern or the photosensor array, where the frequencies of the imaged or projected visible pattern and the photosensor array are equal to the reciprocal of the distance separating adjacent imaged or projected pattern demarcations or separating adjacent photosensor elements, respectively. In this regard, lateral motions of the object bearing the visible pattern, made parallel to the direction of the repetition of the repeating patterns, produces a shift in the position of the lower spatial frequency signal envelope. Even slight displacements of the object bearing the visible pattern can be readily detected since they cause relatively large displacements of the envelope pattern which has a lower spatial frequency than either the array geometry or that of the imaged or projected pattern.

FIGS. 4A and 4B illustrate the visible pattern as being linear and the photosensor array as being two-dimensional. However, as will be appreciated by persons of ordinary skill in the art, other shapes and configurations may be implemented, consistent with the concepts and teachings of the present invention. In this regard, the preprinted pattern may be a concentric configuration of circles (see FIGS. 1A–1C), triangles (see FIGS. 3A–3B) or a variety of other configurations. The linear configurations illustrated may be preferred, as the processing required by the circuitry will generally be simpler than when a more complex configuration is implemented.

As will be appreciated by persons skilled in the art, the present invention may also be used to measure magnification changes using Moiré amplification. In this regard, with a lens that is not telecentric, movements of an object plane in and out of the intended field plane cause changes in magnification that can be precisely measured by using the Moiré envelope signal to detect changes in the pitch of a regular pattern on the object surface relative to the pitch of pixel pattern(s) in photosensor arrays. A microscope is an example of an environment where this feature of the invention may be utilized. For example, it may be used in a microscope having a built-in photosensor array imager and a calibration pattern on a calibration object surface.

Figures 5A, 5B:
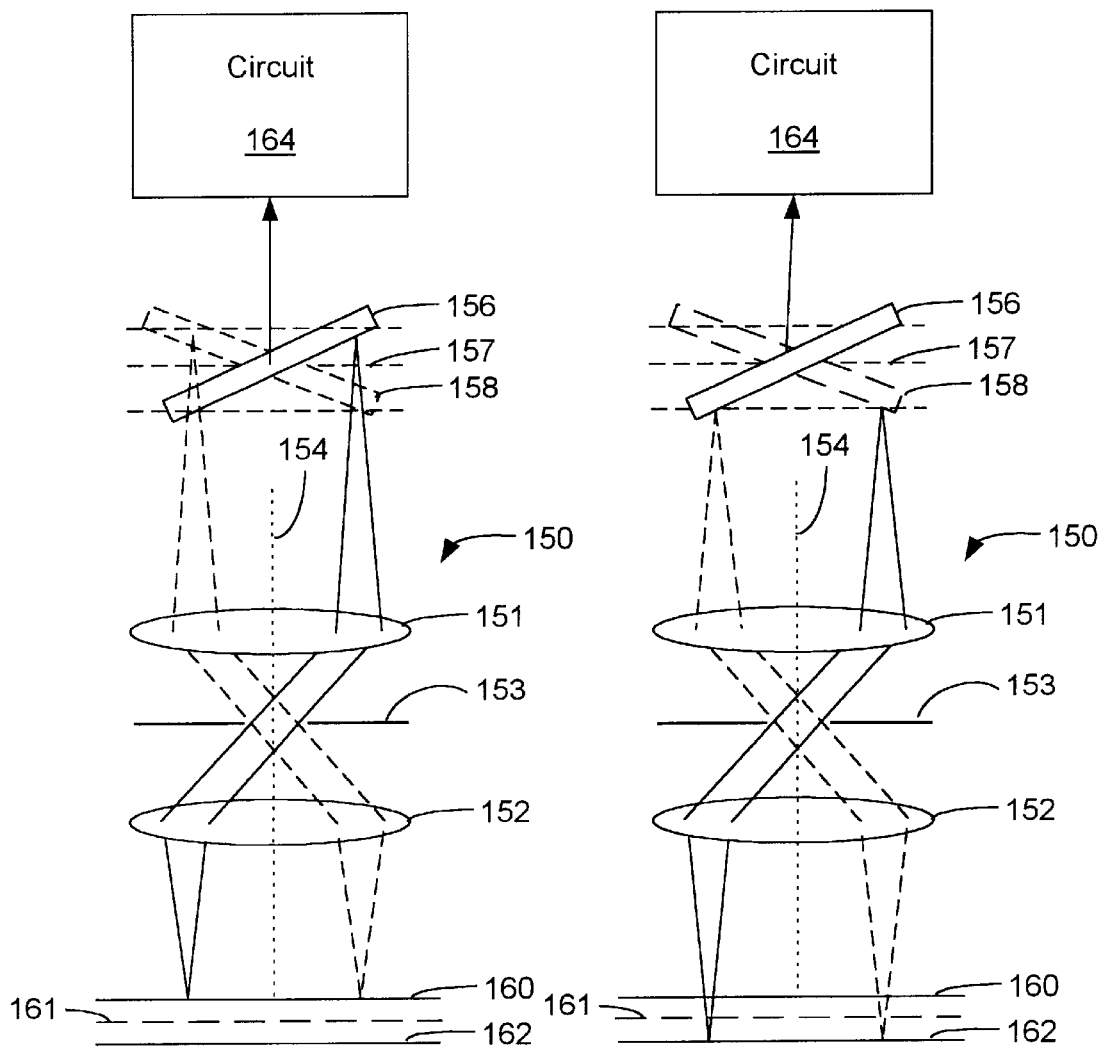
FIGS. 5A and 5B are diagrams of a system used to measure the tilt of an object, constructed in accordance with an alternative embodiment of the invention.

Another aspect of the present invention is to provide a system for measuring the tilt of a device. In this regard, reference is made to FIGS. 5A and 5B which illustrate a tilt-measuring system constructed in accordance with this other aspect of the present invention. In these figures, FIG. 5A illustrates the projection of an image from a first focal plane 160 onto the two photosensor arrays 156 and 158, and FIG. 5B illustrates the projection of an image from a second focal plane 162 onto the same two photosensor arrays 156 and 158. In accordance with this aspect, the system includes a telecentric lens 150 that, as mentioned above, includes a pair of lenses 151, 152 and an aperture stop 153 that allows the object surface, having the visible pattern, to deviate from the mid-focal plane 161 of the lens 150, without significantly affecting the pitch of the image pattern at the array by an otherwise change in effective magnification, although not without blurring. The individual lenses 151, 152 and aperture stop 153 of the telecentric lens 150 are aligned along a central axis. Object points on the plane 161 will be in best focus at focal points on the image plane 157, and blurred elsewhere. A first photosensor array 156 is disposed alongside the central axis 154 and angled with respect to the central axis. Similarly, a second photosensor array 158 is disposed alongside the central axis 154 and, like the first photosensor array 156, is angled with respect to the central axis 154. Indeed, the second photosensor array 158 is angled at an angle substantially opposite the angle of the first photosensor array 156. Further, the first and second photosensor arrays are disposed on a side of the telecentric lens 150 opposite the object (not shown) and to opposite sides of the axis 154. Thus, object points on any parallel plane to planes 160, 161, or 162 will be in best focus at some conjugate image points on the two arrays 156 and 158, while object points at other distances from the plane containing the axis 154 and orthogonal to the plane of the figure will be blurred. Finally, a circuit 164 is provided in electrical communication with the first and second photosensor arrays 156, 158. The circuit 164 is configured to locally evaluate relative image contrasts from the electrical signals output from the first and second photosensor arrays 156, 158 to determine the tilt of the object.

As shown in the drawings, the first and second photosensor arrays 156 and 158 are angled to achieve best focus of at least a portion of an object surface disposed between a first image plane 160 and a second image plane 162. As illustrated, the upper portions of the photosensor arrays 156 and 158 correspond to the first focal plane 160, and the lower portions of the photosensor arrays 156 and 158 correspond to the second focal plane 162. That is, the image of an object that is coincident with the first focal plane 160 will be projected by the lens 150 to be in best focus on the upper portion of the photosensor arrays. Thus, as shown in FIG. 5A, points on the focal plane 160 but outward from the axis 154 project through the lens 150 and focus best at points corresponding to the upper portions of the photosensor arrays. Conversely, points on the focal plane 162 and outward from the axis 154 project through the lens 150 and focus best at points corresponding to the lower portions of the photosensor arrays. If a portion of an object is located between the focal planes 160 and 162 on plane 161, then the points on the object from these points will focus best on the arrays 156 and 158 where these arrays intersect the conjugate plane 157, at points nearer the axis 154 than those shown. As will be appreciated, the separation distance between the focal planes 160 and 162 will be determined by the size and angular disposition of the photosensor arrays 156 and 158 and the depth of field of the lens 150. Thus, the distance of separation between the focal planes 160 and 162 will increase as the size (length) of the photosensor arrays 156 and 158 increases (for a given angle), and as the angle to the horizontal of the photosensor arrays increases (for a given length).

A circuit 164 is disposed to receive and evaluate electrical signals generated by the photosensor arrays 156 and 158. In this regard, the circuit 164 will preferably include a processor (not shows) that may be configured to execute segments of code that control the operation of the processor to evaluate the signals received from the photosensor arrays 156 and 158 to carryout the operation of the system, as generally set out herein.

As will be described in more detail in connection with FIGS. 6A, 6B, 6C and 7, the crossed configuration of the photosensor arrays 156 and 158 allows the system to determine whether an object surface is level (i.e., parallel with the focal planes 160, 161, and 162), or tilted. As will be appreciated by those skilled in the art, there will be a variety of applications for the system of FIGS. 5A and 5B.

The system, however, will detect the surface of an object disposed between the first and second focal planes 160 and 162 by detecting a light pattern on the surface of the object. As will be appreciated by persons skilled in the art, the pattern on the object may be a created pattern that is preprinted on the object. Alternatively, it may be a surface pattern that is inherent in the material itself, such as fiber patterns in plain paper. Alternatively, it could be either a natural or created pattern disposed on the object. In this regard, the pattern may be that of a natural material pattern inherent to structure-related properties of the material of the object. "Inherent structure-related properties" are defined herein as properties of the original that are attributable to factors that are independent of forming image data and/or of systematic registration data on the original. "Inherent structural features" are defined herein as those features of an original that are characteristic of processes of forming the original and are independent of forming image data and/or systematic registration data on the original. Often, the inherent structural features are microscopic, e.g., between 1 and 100 $\mu$m, features of surface texture.

In one embodiment, the photosensor arrays may be one-dimensional arrays (e.g., either a column or a row of photosensor elements). In such an embodiment, the system will detect tilt in one dimension of the object (e.g., left-right tilt). In an alternative embodiment, the photosensor arrays may be two-dimensional arrays. In such an embodiment, the system will detect tilt in either (or both) of two dimensions. In this regard, FIGS. 6A and 6B illustrate the system using one-dimensional photosensor arrays and FIGS. 7A and 7B illustrate the system using two-dimensional photosensor arrays.

Figure 6A:
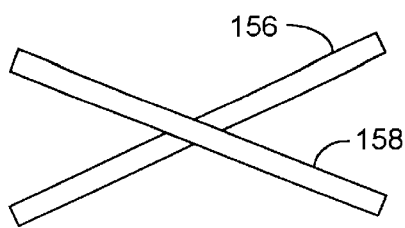
FIG. 6A is a diagram illustrating a hypothetical light pattern sensed by tilted one-dimensional photosensor arrays for an untilted object positioned at a central focal plane.
Figure 6A:
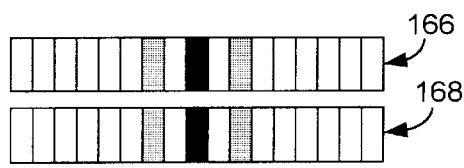

To better illustrate the operation of the system of FIGS. 5A and 5B, reference is now made to FIG. 6A, which illustrates the first and second photosensor arrays 156 and 158 along with a graphical depiction 166 and 168 of the intensity of light sensed by the photosensor arrays 156 and 158 respectively. For purposes of simplifying the illustration, assume that each of the photosensor arrays 156 and 158 are one-dimensional arrays, each having seventeen photosensor elements. Each photosensor element generates an electrical signal that corresponds to the intensity of the light received by that photosensor element. A hypothetical example is present in blocks 166 and 168. Specifically, each of these blocks has seventeen individual sub-blocks. The shading within these sub-blocks is representative of the light incident upon that photosensor element. Thus, the rightmost and leftmost sub-blocks of blocks 166 and 168 contain no shading, representing regions of relatively low contrast. The middle sub-blocks have alternatingly dark and light sub-blocks, indicating higher contrast among those photosensor elements. Thus, the image of the object is in good focus in the middle regions of arrays 166 and 168. It will be appreciated that the example illustrated in the drawings is an extremely simplified example that has been simplified merely for purpose of illustration. In practice the photosensor elements will be of an analog nature, having analog outputs, and therefore will support an infinite spectrum of varying light intensities and focus. Also, there will, in practice, be many more photosensor elements than the relatively few seventeen elements of FIGS. 6A and 6B. The interpretation from the illustrated positions of best contrast is that the object must be positioned coplanar with plane 161 (See FIGS. 5A and 5B).

The particular magnitude of best focal contrast of the various photosensor elements is not significant for purposes of the invention, but only its magnitude relative to other positions of the arrays.

Figure 6B:
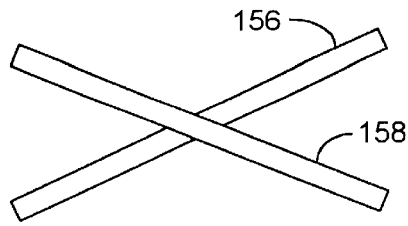
FIG. 6B is a diagram illustrating a hypothetical light pattern sensed by tilted one-dimensional photosensor arrays for an untilted object positioned out of a central focal plane.
Figure 6B:
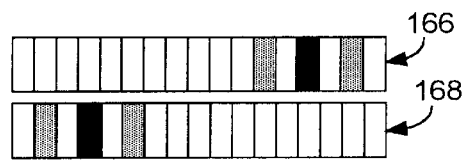

In contrast, and as illustrated in FIG. 6B, the regions of highest contrast from the photosensor elements of the first and second photosensor arrays 156 and 158 (as represented by block 166 and 168) are shifted outward from center in opposite directions. The high-contrast pattern in photosensor array 156 (block 166) has moved to the right while that of the photosensor array 158 (block 168) has moved to the left, indicating that the surface of the object is level or parallel to the focal planes 160, 161, and 162, but displaced closer to plane 160. The degree to which the photosensor elements differ will be evaluated by the circuit 164 to determine the magnitude of tilt of the target object.

Figure 6C:
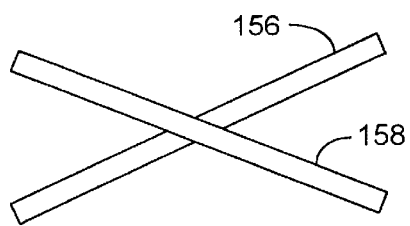
FIG. 6C is a diagram illustrating a hypothetical light pattern sensed by tilted one-dimensional photosensor arrays for an object that is tilted about an axis that is parallel to the axis of tilt of the photosensor arrays, lies in the central focal plane and intersects the optical axis.
Figure 6C:
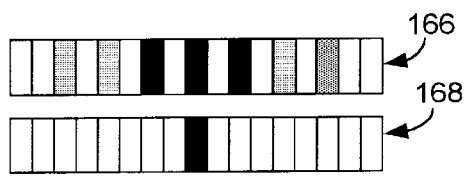

FIG. 6C illustrates a tilt of the object about an axis lying in plane 161 and normal to the page. As shown, the contrasts reflected in blocks 166 and 168 represent a tilt about an axis that puts the object more nearly parallel to array 156 and less parallel to array 158.

Figure 7:
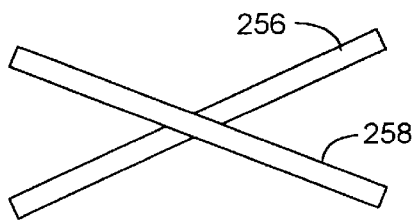
FIG. 7 is a diagram illustrating a hypothetical light pattern sensed by tilted two-dimensional photosensor arrays for an object that is tilted about an axis that is perpendicular to the axis of tilt of the photosensor arrays, lies in the central focal plane and intersects the optical axis.
Figure 7:
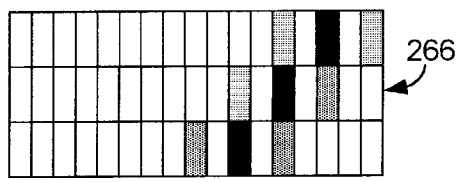
Figure 7:
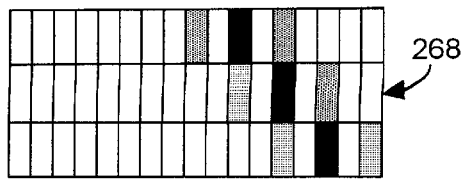

Reference is briefly made to FIG. 7 which is similar to the illustration of FIG. 6A, except that the embodiment illustrated in FIG. 7 utilizes two two-dimensional photosensor arrays 256 and 258. Blocks 266 and 268 represent the contrast intensities detected by the photosensor elements of the photosensor arrays 256 and 258, respectively. As illustrated, the contrasting sub-blocks of the blocks 266 and 268 of FIG. 7 indicate that the object surface includes the line of intersection between plane 161 and the plane of FIG. 7, but is tilted about that line as an axis of rotation.

Although not shown in the drawings, a beam splitter may be inserted between the lens 150 and the arrays 156, 158 and the photosensor arrays 156 and 158 repositioned so that they both view the same region of the object surface. In the preferred embodiment, the arrays 156 and 158 are laterally offset, so that they view a laterally offset region of the object surface. Although such a configuration is generally acceptable for purposes of detecting object tilt (particularly where the object surface is planar), it may be desired in some environments to have the arrays 156, 158 to view the same region of the object. Proper configuration of a beam splitter between the lens 150 and the arrays 156, 158 would achieve this goal.

As will be appreciated, the use of two-dimension photosensor arrays 256 and 258 facilitates the detection of tilt in each of two different directions. Also, one skilled in the art will appreciate that the arrays can be tilted in different ways than illustrated herein. Furthermore, prisms could be used to give the effect of tilting the arrays, wherein the arrays can then be coplanar or even become portions of a larger single array. For example, the arrays may be disposed in an untilted (horizontal) fashion and prisms placed between the arrays and the object (preferably adjacent the arrays). The prisms could be shaped or otherwise configured to redirect the light passing through them and thereby impart "effective" tilts to the arrays. For example, a wedge-shaped prism could be placed in front of each of two arrays. In this way, the remainder of the system may be configured to operate as described herein.

In yet another configuration, a single, circular photosensor array (and possibly a circularly symmetric prism) may be used. Photosensor elements may be distributed across the entire array. The image contrast detected by the various photosensor elements may be evaluated and correlated to determine the tilt of an object surface. In another configuration a three dimensional array with conical coordinates, or a two dimensional array with circular coordinates and an inverse conical prism. These variations of the invention, however, are all within the broad concepts and teachings discussed herein, and need not be specifically described further.

Figure 8:
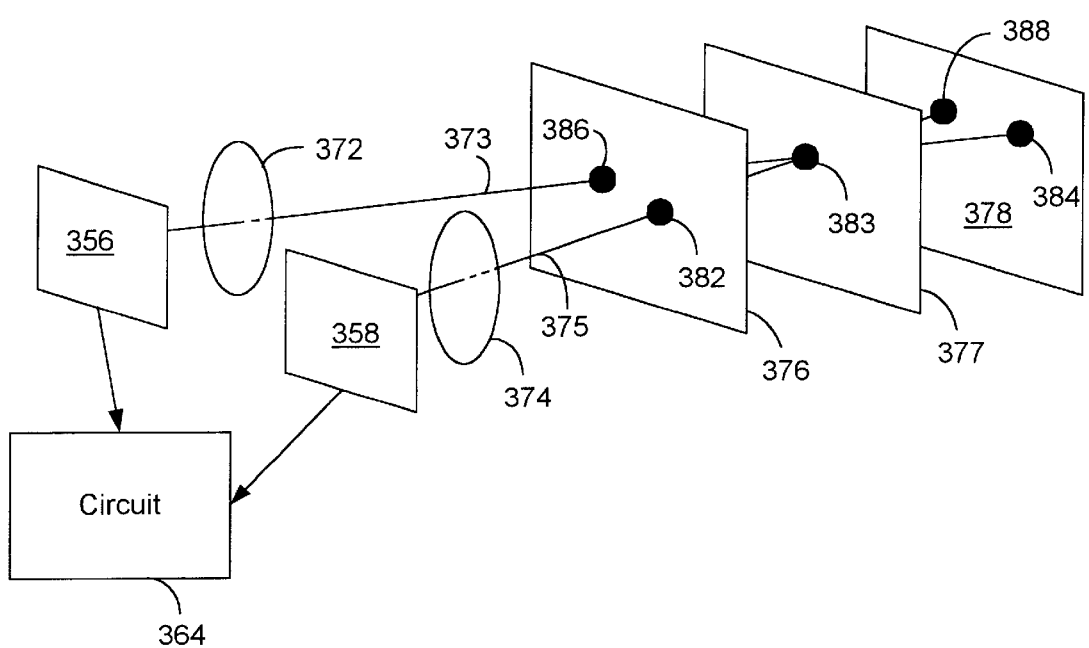
FIG. 8 is diagram illustrating an alternative embodiment of the present invention that may be utilized in a three-dimensional tracking system.

Reference is now made to FIG. 8, which illustrates yet another embodiment of the present invention. In accordance with this embodiment of the invention, the system includes two different lenses 372 and 374 oriented in a similar, but slightly different direction. More particularly, a first lens 372 having a relatively deep depth of field is disposed along a first optical axis 373. Similarly, a second lens 374 also having a relatively deep depth of field is disposed along a second optical axis 375. The second optical axis 375 is slightly angled with respect to the first optical axis 373 so that they are not parallel, but in such a way that the first and second lenses 372 and 374 have a shared field of view in which a target object 383, to be tracked, may be located. In this regard, a first photosensor array 356 is disposed substantially orthogonal to the first optical axis 373 and opposite the shared field of view. Likewise, a second photosensor array 358 is disposed substantially orthogonal to the second optical axis 375 and opposite the shared field of view. Finally, a circuit 364 is disposed in electrical communication with the first and second photosensor arrays 356 and 358, wherein the circuit 364 is configured to evaluate electrical signals output from the first and second photosensor arrays 356 and 358 to track the movement of an object 383 within the shared field of view.

Preferably, the lenses 372 and 374 are positioned to provide the photosensor arrays 356 and 358 deep depths-of-fields ranging from a near object plane 376 to a far object plane 378. As illustrated, the optical axes 373 and 375 are angled with respect to one another, and intersect at point 383 in object field 377. As will be appreciated by persons skilled in the art, the system of FIG. 8 may be configured such that the images received by the photosensor arrays 356 and 358 are nearly identical for an object positioned at point 383 in the object plane 377, except for the small difference caused by the difference in perspective.

If, however, such an object moves out of the object plane 377 to a new object plane (at or between the planes 376 and 378), the respective images received by the photosensor arrays 356 and 358 will shift within the planes of their image frames. The direction and magnitude of this shift will be indicative of the displacement between the object planes. Such shifting is revealed by first observing that centers of the image frames of the two photosensor arrays 356 and 358 will be coincident with the respective images of the object point 383, which lies at the intersection of the two optical axes 373 and 375. When an object surface moves from the object plane containing this intersection point 383 to another object plane, such as the near or far object planes 376 and 378, the points on the object surface that move to the centers of the arrays become two points: 386 and 382 on the near object plane 376, and 388 and 384 on the far object plane 378. Measurement of the differences in image shifting between the two arrays can be used to interpret the three-dimensional movement of the object surface. In this regard, measurements of image shifts can be performed by, for example, a processing circuit 364, by correlation techniques between successive images or their sub-images, or by heuristic techniques known and understood by those skilled in the field of image motion tracking.

The foregoing description is not intended to be exhaustive or to limit the invention to the precise forms disclosed.

Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A system for taking displacement measurements of an object comprising:
    an object with a surface area presenting a visible pattern, said pattern being projected as an image pattern onto a plurality of photo sensors, said image pattern comprising systematic changes in radiant intensity;
    said plurality of photosensors uniformly spaced apart in a configuration similar to the imaged pattern; and
    a circuit electrically connected to the plurality of photo sensors, the circuit configured to evaluate an electrical signal generated by the plurality of photosensors to determine the displacement of the object.

2. The system as defined in claim 1, further including a lens displaced to project the pattern of the object as an image pattern onto the plurality of photosensors.

3. The system as defined in claim 1, wherein the displacement of the object includes translational displacement.

4. The system as defined in claim 1, wherein the displacement of the object includes rotational displacement.

5. The system as defined in claim 1, wherein the visible pattern is a series of parallel, linear marks that are uniformly spaced apart.

6. The system as defined in claim 1, wherein the plurality of photosensors are disposed in an array.

7. The system as defined in claim 5, the uniform space between photosensors is slightly different than the uniform space between the parallel, linear marks.

8. The system as defined in claim 1, wherein the circuit includes a central processing unit and a memory.

9. The system as defined in claim 2, wherein the lens is a telecentric lens.

10. The system as defined in claim 6, wherein the array is one-dimensional.

11. The system as defined in claim 6, wherein the array is two-dimensional.

12. The system as defined in claim 1, wherein the plurality of photosensors is disposed in a circularly symmetric array.

13. A system for taking displacement measurements of an object comprising:
    an object with a surface area presenting a visible pattern;
    projecting means for projecting said visible pattern into an image pattern, the image pattern comprising systematic changes in radiant intensity;
    photosensor means for receiving the image pattern; and
    circuit means for evaluating an electrical signal generated by the plurality of photosensors to determine the displacement of the object;
    wherein the photosensor means includes photosensor elements that are spatially configured in a pattern substantially similar to the image pattern so that the circuit means can efficiently detect even small displacements in the object by measuring a phase of an envelope of the electrical signal.

14. A system for taking displacement measurements of an object comprising.
    an object with a surface area presenting a visible pattern;
    a telecentric lens spaced apart from the object and configured to project the visible pattern as an image pattern, the image pattern comprising systematic changes in radiant intensity;
    a plurality of photosensors disposed to receive the projected image pattern, the plurality of photosensors disposed in a configuration that is sustantially similar to the image pattern, the configuration of the photosensors having only a slightly different pitch than the image pattern; and
    a circuit electrically connected to the plurality of photosensors to receive an electrical signal generated by the plurality of photosensors, the circuit being specifically configured to evaluate a phase of an envelope of the electrical signal, wherein the phase is used to determine the displacement of the object.

* * * * *

UNITED STATES PATENT AND TRADEMARK OFFICE
CERTIFICATE OF CORRECTION

| | | |
|---|---|---|
| PATENT NO. | : 6,188,058 B1 | Page 1 of 1 |
| APPLICATION NO. | : 09/154931 | |
| DATED | : February 13, 2001 | |
| INVENTOR(S) | : Barclay J. Tullis | |

It is certified that error appears in the above-identified patent and that said Letters Patent is hereby corrected as shown below:

IN THE CLAIMS

Claim 14, Column 14, line 25, after "comprising" delete "." and insert therefor --:--

Signed and Sealed this

Fifteenth Day of September, 2009

David J. Kappos
*Director of the United States Patent and Trademark Office*